(No Model.)

E. K. ROLLINS.
CUTTER FOR CUTTING GLASS TUBES.

No. 310,914. Patented Jan. 20, 1885.

Witnesses:
J. P. Theo. Lang.
Robt. L. Fenwick.

Inventor:
Edward K. Rollins
by his Atty's
Fenwick & Lawrence

United States Patent Office.

EDWARD K. ROLLINS, OF SCRANTON, PENNSYLVANIA, ASSIGNOR OF ONE-HALF TO ALEXANDER E. HUNT, OF SAME PLACE.

CUTTER FOR CUTTING GLASS TUBES.

SPECIFICATION forming part of Letters Patent No. 310,914, dated January 20, 1885.

Application filed May 26, 1884. (No model.)

*To all whom it may concern:*

Be it known that I, EDWARD K. ROLLINS, a citizen of the United States, residing at Scranton, in the county of Lackawanna and State of Pennsylvania, have invented a new and useful Improvement in Cutters for Cutting Glass Tubes, of which the following is a specification.

Heretofore glass tubes have been and are now ordinarily cut into desired lengths by either using a diamond or a file with which to cut into the outer surface of the tube, but which practice is subject to the objection that after being so cut the tube will not always break off or become parted at the point where cut, thus failing to secure an even square cut edge at the point of fracture. My invention is designed to avoid this difficulty, and by an implement easily and cheaply constructed, and which can be used with great facility.

Figure 1:
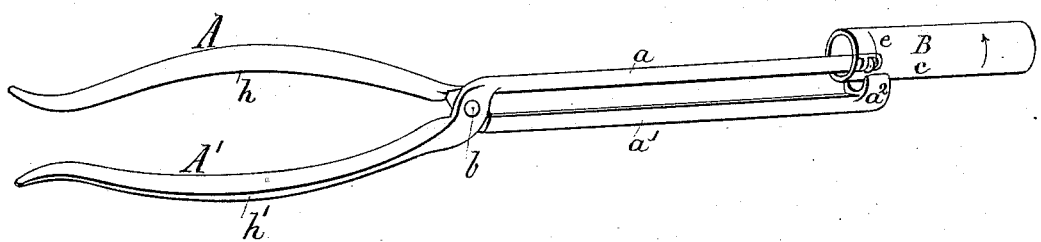
Figure 2:
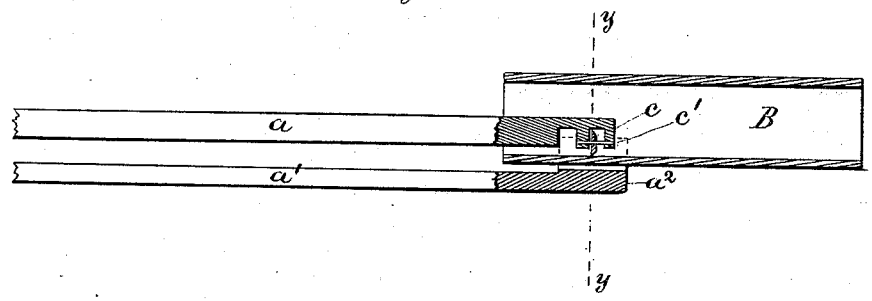
Figure 3:
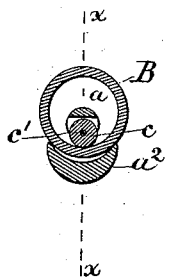

In the accompanying drawings, Figure 1 is a perspective view of my improved cutter for cutting glass tubes, the same being shown in connection with a glass tube to be cut. Fig. 2 is partially a longitudinal section of Fig. 1 in the line $x\,x$ of Fig. 3, this view only showing the two legs of the implement forward of their hinge-joint connection; and Fig. 3 is a cross-section in the line $y\,y$ of Fig. 2.

As shown in the drawings, my glass-tube cutter is tong-shaped, and consists of two main parts, A and A', hinged together and articulating in unison with each other on a pivot, $b$, as shown in Fig. 1. Forward of their joint connection or pivot $b$, the main part A' is constructed with a round leg, as $a$, while the main part A is made with a semicircular leg, $a'$, which, at its forward extremity, terminates in a concaved clamp-piece, as at $a^2$, so that when the implement is in working position this clamp-piece will fit and abut against the exterior of the glass tube which is to be cut, and thus, in connection with the impact of the cutting-disk against the inside of the glass tube, hold the tube steady and firmly in position between the parts A A' at a right angle with the cutter while the glass tube is being cut. As represented, the part A' has its round leg $a$ at its forward extremity provided, as shown, with the well-known cast-steel disk, $c$, heretofore in common use on ordinary cutters for cutting sheet-glass, said cutter $c$ being held in place and free to rotate upon its axle $c'$, as shown.

In rear of the pivot $b$ the parts A A' are constructed in the form of handles, as $h\,h'$, to readily be grasped by the operator using the implement.

In using the cutter the handles are grasped with the right hand of the operator, while the tube B is held in his left. The leg $a$, for example, is now inserted within the tube B, as shown in Fig. 1, while the leg $a'$, with its clamp-piece $a^2$, is closed up so as to bring the clamp against the outside of the tube directly opposite the point of impact of the disk $c$ against the interior surface of the tube, as shown. The operator now, by pressing together the handles with his right hand, imparts the requisite pressure upon the disk $c$ to cause it to cut a circular channel, $e$, on the inside of the glass tube B when the tube is rotated with his left hand in the direction of the arrow. The rotation and pressure having been continued a brief time, the cutter is now withdrawn from the tube, whereupon a slight tap upon the tube below the point of cut or channel $e$ will cause the tube to separate at such point, leaving an even, square-cut, "clean" edge at the separated ends of the glass tube.

It will be seen that the parts A $a'$ and A' $a$ are crossed and hinged together, and constitute a hand-lever implement, which, by the grasp of the hand of the operator upon the handles $h\,h'$, will cause the disk $c$ and clamp $a^2$ to approach each other and hold the glass tube in positive position during the act of cutting the channel, while at the same time the necessary pressure for insuring the cut in the glass on the inside of the tube is simultaneously applied.

What I claim is—

1. A cutter for cutting glass tubes, comprising the parts A $a'\,a^2$ and A' $a$ and disk $c$, the parts A $a'$ and A' $a$ being crossed and pivoted together at $b$, so that by pressing together the handles $h\,h'$ a glass tube, B, may be grasped by the disk $c$ on the part A' $a$ on the inside of the tube, and by the clamp-piece $a^2$ on the part A $a'$ on the outside of the tube, substantially as and for the purpose described.

2. A cutter for cutting glass tubes, which comprises in its construction crossed and jointed operating parts, which carry a cutter and a clamp, whereby a circular channel can be cut on the inside of the tube, while the tube is held by the external pressure of the clamp-piece $a^2$ in conjunction with the interior cutting-disk, $c$, from moving out of a right angle with said disk during the act of cutting the channel, substantially as described.

3. The within-described hand-lever implement for cutting determined circular lines of fracture on the inner surface of glass tubes, the said implement comprising parts A A', pivoted together at $b$ and constructed to serve as handles at their rear ends, and one part provided with a revolving cutter for entering the bore of the glass tube, and the other with a concave clamping-piece, substantially as described.

EDWARD K. ROLLINS.

Witnesses:
I. L. POST,
W. J. FOOTE.